US008126753B2

(12) United States Patent
Anerousis et al.

(10) Patent No.: US 8,126,753 B2
(45) Date of Patent: Feb. 28, 2012

(54) EVALUATION OF A PROCESS METRIC

(75) Inventors: Nikolaos Anerousis, Chappaqua, NY (US); Abhijit Bose, Paramus, NJ (US); Genady Grabarnik, Scarsdale, NY (US); Debanjan Saha, Mohegan Lake, NY (US); Larisa Shwartz, Scarsdale, NY (US); Shu Tao, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1240 days.

(21) Appl. No.: 11/834,328

(22) Filed: Aug. 6, 2007

(65) Prior Publication Data

US 2009/0043619 A1   Feb. 12, 2009

(51) Int. Cl.
  *G06F 17/60*   (2006.01)
(52) U.S. Cl. ..................................................... 705/7.11
(58) Field of Classification Search .................. 705/7.11
  See application file for complete search history.

(56) References Cited

U.S. PATENT DOCUMENTS

| | | | |
|---|---|---|---|
| 5,311,759 A | 5/1994 | Mangrulkar et al. | |
| 6,253,115 B1 | 6/2001 | Martin et al. | |
| 6,473,720 B1 | 10/2002 | Hampson | |
| 6,601,233 B1 * | 7/2003 | Underwood | 717/102 |
| 6,816,747 B2 | 11/2004 | Mammoser et al. | |
| 6,816,898 B1 | 11/2004 | Scarpelli et al. | |
| 6,886,020 B1 | 4/2005 | Zahavi et al. | |
| 7,006,878 B2 | 2/2006 | Schweizerhof et al. | |
| 7,162,390 B2 * | 1/2007 | Jowett et al. | 702/182 |
| 2006/0080321 A1 * | 4/2006 | Horn et al. | 707/10 |
| 2006/0112109 A1 | 5/2006 | Chowdhary et al. | |
| 2007/0006128 A1 | 1/2007 | Chowdhary et al. | |
| 2007/0047439 A1 | 3/2007 | An et al. | |

OTHER PUBLICATIONS

Ladislav (An Implementation of Recursive Quadratic Programming Variable Metric Methods for Linearly Constrained Nonlinear Minimax Approximation). Dec. 1985, institute of Information Theory and Automation, pp. 22-40.* Cohen et al "Reducing business surprises through proactive, real-time sensing and alert management", Dec. 2005, workshop on End-to-end, sense-and-respond systems, pp. 1-6.*
H.J. Harrington et al., "Mobilizing the Right Lean Metrics for Success," Quality Digest, QCI International, 2006, pp. 32-38, vol. 26, No. 5.
S. Phadnis, "Selection of Project Metrics," iSixSigma.com, Oct. 2001, 3 pages.

* cited by examiner

*Primary Examiner* — Romain Jeanty
(74) *Attorney, Agent, or Firm* — Louis J. Percello; Ryan, Mason & Lewis, LLP

(57) ABSTRACT

An exemplary method of responding to a request for a value of at least one metric associated with at least one process includes a step of determining whether responding to the request requires updating the value of the at least one metric. When responding to the request does not require updating the value of the at least one metric, a response is determined based at least in part on at least one stored value of the at least one metric. When responding to the request does require updating the value of the at least one metric, the value of the at least one metric is updated and a response is determined based at least in part on the at least one updated value of the at least one metric. Updating the value of the at least one metric, at least when responding to the request requires updating the value of the at least one metric, includes steps of determining at least one new value of the at least one metric based at least in part on at least one stored value of the at least one metric and storing the at least one new value of the at least one metric. The method also includes a step of responding to the request with the determined response.

24 Claims, 3 Drawing Sheets

EVALUATION OF A PROCESS METRIC

FIELD OF THE INVENTION

The present invention relates generally to metrics evaluation, and more particularly relates to monitoring and reporting of a process metric.

BACKGROUND OF THE INVENTION

Metrics evaluation systems are frequently used to monitor the performance of a process, typically a business process. For example, it may be desirable to ensure compliance with various constraints associated with the application of such well-known process optimization methodologies as Six Sigma® (a registered trademark Motorola, Inc., Schaumberg, Ill.) and/or Lean techniques. Six Sigma typically focuses on improving quality by decreasing variability, whereas Lean techniques focus on improving speed by reducing waste. These two methodologies are often used in conjunction with each other and/or other complimentary process optimization methodologies known to one having skill in the art.

One of the crucial elements of performing a Six Sigma or Lean process optimization is the selection of appropriate project metrics to be used as benchmarks in measuring process efficiency. Exemplary metrics used in conjunction with Lean techniques may include Customer satisfaction, Repeat sales, Market share, Mean time-to-failure, Poor-quality cost, Early-life failure rates, Warranty cost, Percentage of returned items, First-time and throughput yields, Suggestions per employee, and Dollars saved.

With regard to a Six Sigma methodology, a Balanced Scorecard approach is often used for the selection of project metrics as a method for ensuring that the project meets both customer and business needs. The Balanced Scorecard approach includes both financial and non-financial metrics, as well as lagging and leading measures across the four areas or perspectives: Financial, Customer, Internal Processes and Employee Learning and Growth. Lagging measures are those that are measured at the end of an event, while leading measures are measures that help as achieve the objectives and are measured upstream of the event.

Exemplary Financial metrics may include Inventory Levels, Cost Per Unit, Hidden Factory, Activity Based Costing, Cost Of Poor Quality, Overall Project Savings and Total Dollars Saved (TDS). Exemplary Customer metrics may include Customer Satisfaction, On Time Delivery, Final Product Quality and Safety Communications. Exemplary Internal Processes Metrics may include Defects, Inspection Data, Defects Per Million Opportunities (DPMO), Sigma Level, Rolled Throughput Yield (RTY), Supplier Quality, Cycle Time, Volume Shipped and Rework Hours. Exemplary Employee Learning and Growth metrics may include Six Sigma Tool Utilization, Quality of Training, Meeting Effectiveness, Lessons Learned, Total Trained in Six Sigma, Project Schedule Versus Actual Date, Number of Projects Completed, and Total Savings To Date.

A standard approach to implementing process optimization methodologies such as Six Sigma and Lean techniques is an initial engagement that provides recommendations for making a business process more efficient followed by periodic check-ups to ensure compliance with the recommendations. Typically, these recommendations include benchmarks in the form of a constraint on one or more of the aforementioned metrics. This standard approach suffers from several problems, however. Firstly, it can cause the optimization to become desynchronized with the current process status; for example, the process may become non-compliant without being detected until the next check-up. Moreover, the frequent polling of components in order to evaluate metrics may prove to be unnecessarily intrusive, especially in instances when the process remains compliant. Such unnecessary polling may prove deleterious to the performance of the process, thus negating any advantage to be gained from the process optimization.

Accordingly, there exists a need for improved techniques for process metrics evaluation that do not suffer from one or more of the problems exhibited by conventional process metrics evaluation techniques.

SUMMARY OF THE INVENTION

An exemplary method of responding to a request for a value of at least one metric associated with at least one process includes a step of determining whether responding to the request requires updating the value of the at least one metric. When responding to the request does not require updating the value of the at least one metric, a response is determined based at least in part on at least one stored value of the at least one metric. When responding to the request does require updating the value of the at least one metric, the value of the at least one metric is updated and a response is determined based at least in part on the at least one updated value of the at least one metric. Updating the value of the at least one metric, at least when responding to the request requires updating the value of the at least one metric, includes steps of determining at least one new value of the at least one metric based at least in part on at least one stored value of the at least one metric and storing the at least one new value of the at least one metric. The method also includes a step of responding to the request with the determined response.

A system for responding to a request for a value of at least one metric associated with at least one process includes at least one storage module operative to store at least one value of the at least one metric; a first module operative (i) to determine whether updating the value of the at least one metric is required; (ii) when updating the value of the metric is not required to respond to the request, to determine a response to the request based at least in part on at least one stored value of the at least one metric; and (iii) when updating the value of the metric is required to respond to the request, to determine a response to the request based at least in part on an updated value of the at least one metric; and a second module operative to, at least in response to a determination by the first module that an update is required, update the value of the at least one metric, wherein updating the value of the at least one metric includes the steps of: (i) determining at least one new value of the at least one metric based at least in part on at least one stored value of the at least one metric; and (ii) storing the at least one new value of the at least one metric.

An article of manufacture for responding to a request for a value of at least one metric associated with at least one process includes a machine-readable storage medium containing one or more software programs. When executed, these one or more software programs determine whether responding to the request requires updating the value of the at least one metric. When responding to the request does not require updating the value of the at least one metric, the programs determine a response based at least in part on at least one stored value of the at least one metric. When responding to the request does require updating the value of the at least one metric, the programs update the value of the at least one metric and determining a response based at least in part on the at least one updated value of the at least one metric. Updating the value of the at least one metric, at least when responding to the request requires updating the value of the at least one metric, includes steps of determining at least one new value of the at least one metric based at least in part on at least one stored value of the at least one metric and storing the at least one new value of the at least one metric. The programs are further operative to respond to the request with the determined response.

These and other objects, features and advantages of the present invention will become apparent from the following detailed description of illustrative embodiments thereof, which is to be read in connection with the accompanying drawings.

DETAILED DESCRIPTION OF THE INVENTION

The present invention will be described herein in the context of illustrative methodologies for monitoring and/or reporting process metrics. It should be understood, however, that although the present invention is described herein primarily as applied to process optimization techniques such as Lean and/or Six Sigma, inventive techniques may be applicable to evaluation of metrics within any number of fields. Moreover, although the preferred embodiments described herein are directed toward the use of a recursively updatable function, the techniques described herein may be applied to any metric using conventional techniques.

As used herein, a recursively updatable function (RUF) is a functional sequence satisfying the relation $a_n = f(a_{n-1}, a_{n-2}, \ldots, a_{n-j}, b_n, b_{n-1}, \ldots, b_{n-k})$, where $a_l$, $b_m$ may be d-dimensional vectors. RUFs have the property that a new function value ($a_n$) may be recursively determined based at least in part on at least one old function value ($a_{n-k}$) and new data ($b_{n-1} \ldots b_{n-k}$) This may be done by, for example, first determining the value $a_{(n-k)+1}$ based at least in part on $a_{n-k}$ and $b_{n-k}$. Next, $a_{(n-k)+2}$ may be determined based at least in part on the previously determined value $a_{(n-k)+1}$ and $b_{(n-k)+1}$. This process may be repeated until $a_n$ is determined based on $a_{n-1}$ and $b_{n-1}$.

Examples of RUFs include mean (e.g., $a_n = 1/n((n-1)a_{n-1} + b_n)$), variance, and moving averages (e.g., $ma_{100}(n) = \frac{1}{2}(ma_{50}(n) + ma_{50}(n-50))$), as well as combinations of the above functions. Moreover, almost all metrics used in conjunction with Six Sigma and Lean process optimization techniques may be calculated using RUFs.

Figure 1:
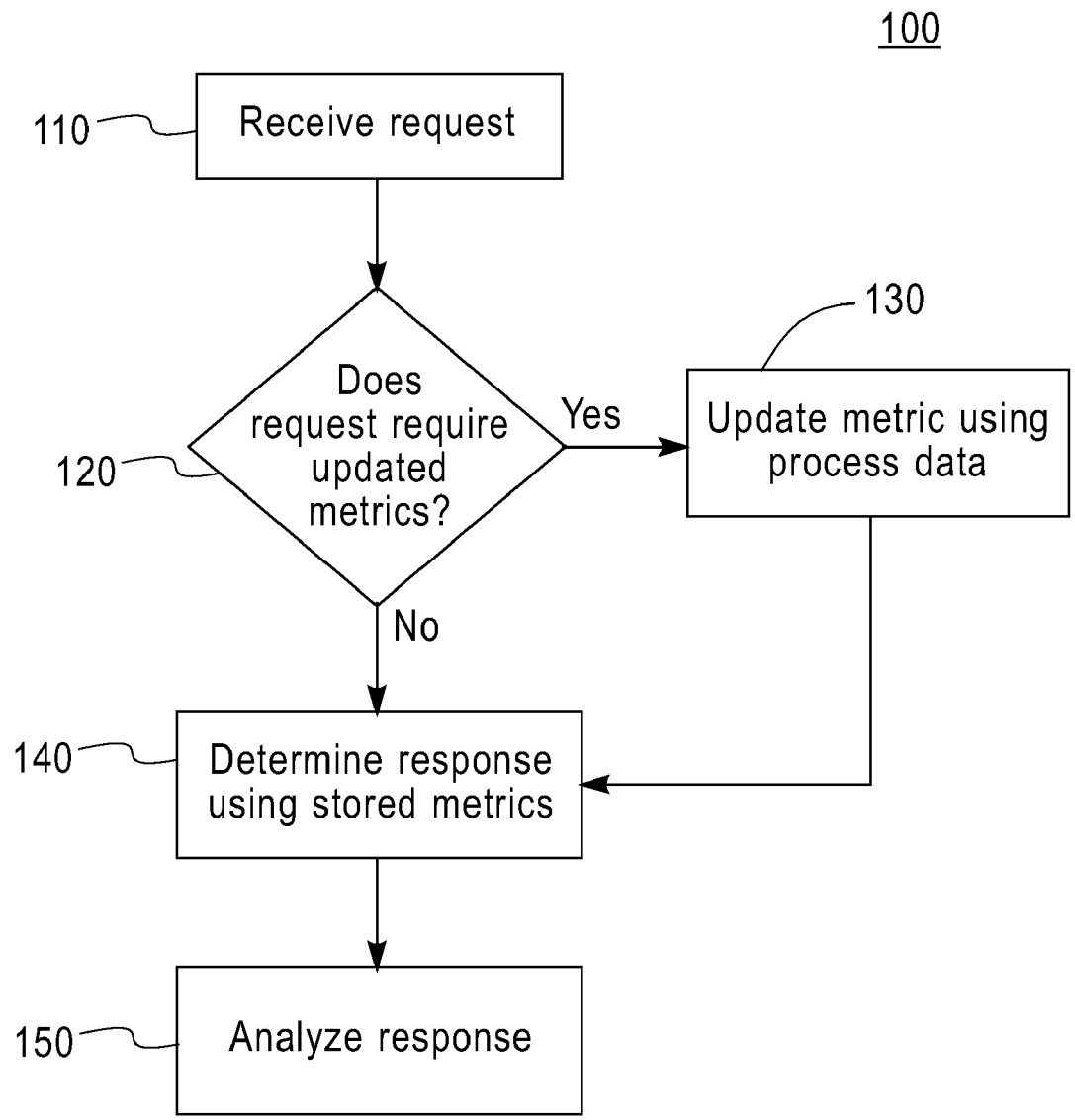
FIG. 1 is a flowchart showing an exemplary method incorporating inventive techniques.

FIG. 1 is a flowchart showing an exemplary method 100 incorporating inventive techniques. The method 100 begins in step 110 with the receipt of a request requiring the evaluation of one or more metrics relating to a process, such as, for example, a request for system status. This request may be generated manually, for example, by a user, or automatically (e.g., on a periodic basis or responsive to a detected change) by a metric evaluation system itself or some other automated system.

In step 120, a determination is made as to whether responding to the request will require updating the value of a metric. For example, in an embodiment wherein the metric is based on a RUF, a request for a previous value of the metric will not require an updated metric, whereas a request for a current value of the metric may require an updated metric. When responding to the request does not require an updated metric, the method 100 proceeds directly to step 140, described below.

When responding to the request requires an updated metric, the method 100 continues in step 130, where an update to the metric is performed. In this step, a new value of the metric is calculated based on, for example, a previous value of the metric and data regarding a process. This data may be historical data or current data and is preferably obtained from a process data storage or an alternative storage element. The new value of the metric is then written to a metric value data storage or an alternative storage element.

In the preferred embodiment wherein the metric comprises a RUF as defined above, this process of calculating a new value, as may be performed in step 130, may comprise first calculating initial values of $a_1, a_2, \ldots, a_j$ then looping by n to get previous values of metrics $a_{n-1}, a_{n-2}, \ldots, a_{n-j}$, get additional data $b_n, b_{n-1}, \ldots b_{n-k}$, and calculate the value of $a_n$ using the formula $a_n = f(a_{n-1}, a_{n-2}, \ldots, a_{n-j}, b_n, b_{n-1} \ldots, b_{n-k})$. After updating the metric in step 130, method 100 continues at step 140.

In step 140, a response to the request is determined, based at least in part on a value of the metric. This may be a value updated in step 130, or a previously stored value. Likewise, this response may also be based at least partially on other data, such as data regarding the process. After determining the response as a function of the value of the metric, method 100 preferably proceeds to step 150.

Step 150 is an optional step in which the result may be analyzed or further processed. For example, the metric may be analyzed to determine whether the process is operating within one or more prescribed constraints, such as one based on a Six Sigma or Lean analysis. This may also include, for example, providing appropriate notifications to the user and/or making manual or automatic adjustments to the process in order to regain compliance with the prescribed constraint(s).

Figure 2:
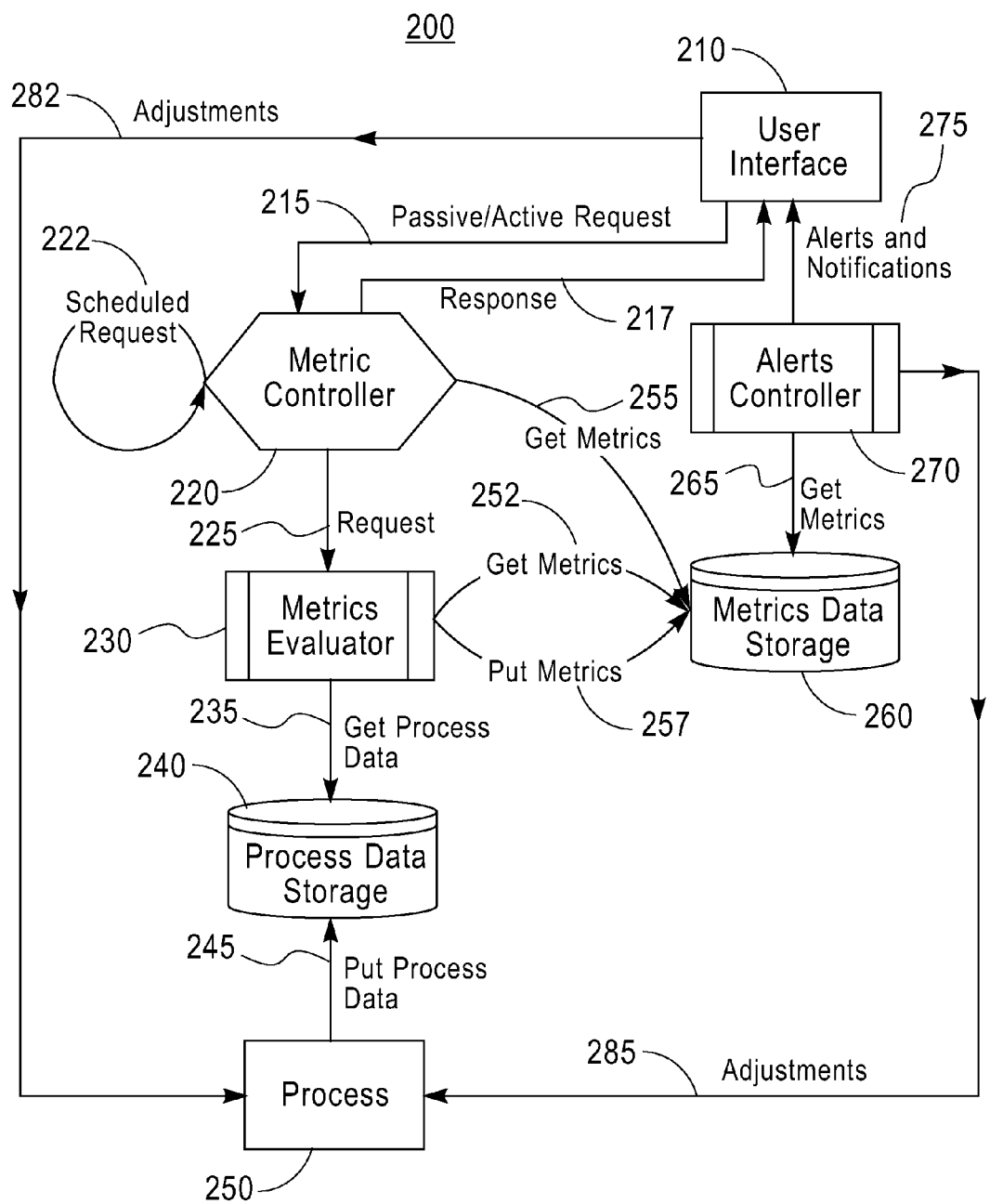
FIG. 2 is a block diagram showing an exemplary system with which the method of FIG. 1 may be used.

With reference now to FIG. 2, a block diagram of an exemplary system 200 is shown with which the method of FIG. 1 may be used, in accordance with an embodiment of the invention. It should be noted that the various components (e.g., for processing and/or storage) described herein may represent, for example, software and/or hardware running on a single computing system or running in a distributed manner on multiple computing systems and/or on multiple functional components (e.g., layers, modules, etc.) of a single computing system. Likewise, one skilled in the art will recognize from the teachings herein that one or more of the components may be combined and/or further separated using a variety of conventional programming and implementation techniques.

Data 245 regarding the process to be monitored 250 is regularly written to a process data storage 240. This may be done by, for example, periodic polling of the process 250 or an automated process, for example, wherein data is written to the storage whenever a value is changed by the process. The term "storage" as used herein is intended to include memory and other computer-readable media associated with a processor or CPU, such as, for example, random access memory (RAM), read only memory (ROM), fixed storage media (e.g., one or more hard drives), removable storage media (e.g., one or more diskettes), optoelectronic storage media (e.g., one or more compact discs (CDs) and/or digital versatile discs (DVDs)), flash memory, etc. It is also intended to include remote storage, such as network-attached storage (NAS) and/or a storage area network (SAN).

User interface 210 is an optional component which may be, for example, a graphical user interface, a command-line interface, or any other means for interfacing between a user and the system 200. In an exemplary embodiment, user interface 210 facilitates the user's monitoring and control of a process. User interface 210 may comprise, for example, components built on a portal server such as, for example, WebSphere® (a registered trademark of IBM Corp., Armonk, N.Y.). User interface 210 may also comprise other web containers or use protocols such as Atom.

System 200 includes a metric controller 220, which is preferably a software module but may be implemented as hardware. Metric controller 220 may be adapted to receive a passive or an active request 215 from the user interface 210 or metric controller 220 may generate a request 222 on, for example, a periodic scheduled basis. Upon receiving a request, metric controller preferably determines whether the request may be satisfied using previously-stored metric values (e.g., those stored in metrics data storage 260), or whether an updated metric is required. When the request 215 does not require an updated metric, the metric controller 220 reads previous metrics values 255 from metrics data storage 260. Metric controller 220 then preferably generates and returns a response 217 to user interface 210.

When the request 215 does require an updated metric, metric controller 220 requests an update 225 from a metrics evaluator 230. Metrics evaluator 230 obtains stored values of metrics 252 from metrics data storage 260. Likewise, metrics evaluator 230 obtains process data 235 from process data storage 240. Metrics evaluator 230 then uses this metrics data and process data to generate an updated value of a metric. For example, this may involve updating the value of a RUF using the new data. Metrics evaluator 230 then stores the updated metric value 257 in metrics data storage 260. Upon completion of the updating process, the metric controller 220 reads the updated metric value 255 from the metrics data storage 260 and uses the updated metric value to generate and return response 217 to user interface 210.

The system 200 may include an optional alerts controller 270. Alerts controller 270 is preferably operative to obtain metrics 265 from the metrics data storage 260. This may be done by, for example, periodic polling of the metrics data storage 260 by the alerts controller 270 or by an automated process wherein whenever an updated metric is written 257 to the metrics data storage 260, the metric is forwarded to the alerts controller 270. The alerts controller 270 determines whether these metrics are within prescribed constraints based on, for example, a Six Sigma or Lean methodology. When the metrics indicate that the process has, for example, become non-lean or otherwise become non-compliant with one or more constraints, the alerts controller 270 may cause an alert or notification 275 to be displayed on the user interface 210. The user, via user interface 210, may implement adjustments 282 to the process 250 based on the results of this comparison between the metrics and the prescribed constraints in order to cause the process to regain compliance with the constraints. Alternatively, or in addition to user initiated adjustments 282, the alert controller 270 may also implement adjustments 285 to the process 250 based on the results of this comparison between the metrics and the constraints in order to modify operation of the process to regain compliance.

Figure 3:
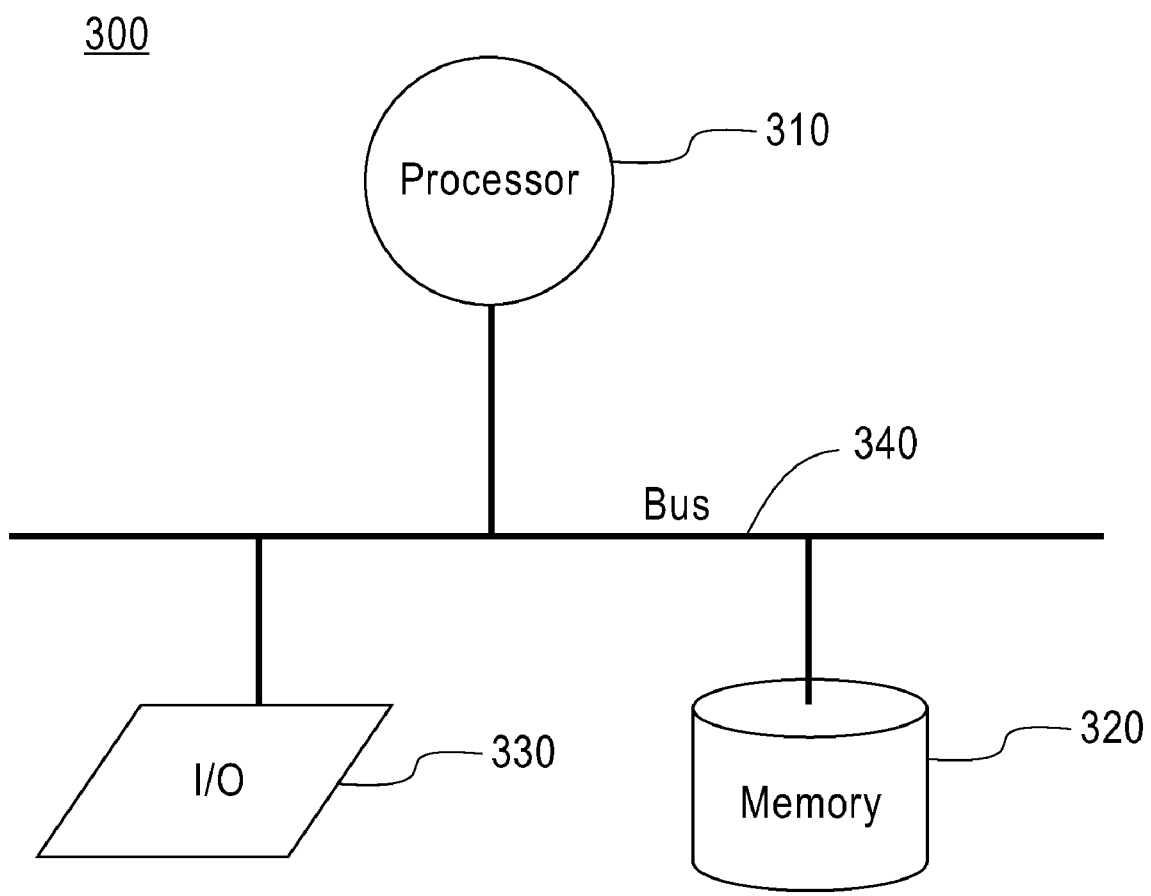
FIG. 3 is a block diagram depicting an exemplary processing system in which inventive techniques may be implemented.

The methodologies of embodiments of the invention may be particularly well-suited for use in an electronic device or alternative system. For example, FIG. 3 is a block diagram depicting an exemplary processing system 300 formed in accordance with an aspect of the invention. System 300 may include a processor 310, memory 320 coupled to the processor (e.g., via a bus 340 or alternative connection means), as well as input/output (I/O) circuitry 330 operative to interface with the processor. The processor 310 may be configured to perform at least a portion of the methodologies of the present invention, illustrative embodiments of which are shown in the above figures and described herein.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

Accordingly, an application program, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 310. In any case, it is to be appreciated that at least a portion of the components shown in the above figures may be implemented in various forms of hardware, software, or combinations thereof, e.g., one or more DSPs with associated memory, application-specific integrated circuit(s), functional circuitry, one or more operatively programmed general purpose digital computers with associated memory, etc. Given the teachings of the invention provided herein, one of ordinary skill in the art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method of responding to a request for a value of at least one metric associated with at least one process, the method comprising the steps of:
   determining whether responding to the request requires updating the value of the at least one metric;
   when responding to the request does not require updating the value of the at least one metric, determining a response based at least in part on at least one stored value of the at least one metric;
   when responding to the request does require updating the value of the at least one metric, updating the value of the at least one metric and determining a response based at least in part on the at least one updated value of the at least one metric; and
   responding to the request with the determined response;
   wherein updating the value of the at least one metric, at least when responding to the request requires updating the value of the at least one metric, comprises the steps of:
   determining the at least one updated value of the at least one metric based at least in part on the at least one stored value of the at least one metric; and
   storing the at least one updated value of the at least one metric; and
   wherein the steps are performed by a processor.

2. The method of claim 1, wherein the at least one metric comprises a recursively updatable function.

3. The method of claim 1, wherein the at least one metric is based at least in part on data related to the at least one process.

4. The method of claim 3, wherein the step of updating the value of the at least one metric comprises retrieving data related to the at least one process and wherein the at least one updated value of the at least one metric is determined based at least in part on the retrieved data.

5. The method of claim 3, further comprising the step of:
determining, based at least in part on the determined response, whether the at least one process satisfies at least one constraint.

6. The method of claim 5, wherein the at least one constraint comprises at least one of a lean process constraint and a six sigma process constraint.

7. The method of claim 3, further comprising the step of:
updating the value of the at least one metric responsive to new data related to the at least one process.

8. The method of claim 1, wherein the step of determining whether responding to the request requires updating the value of the at least one metric comprises the step of determining whether the request is for a current value of the at least one metric or for a previous value of the at least one metric.

9. The method of claim 8, wherein:
when the request is for a current value of the at least one metric, responding to the request does require updating the value of the at least one metric; and
when the request is for a previous value of the at least one metric, responding to the request does not require updating the value of the at least one metric.

10. A system for responding to a request for a value of at least one metric associated with at least one process, the system comprising:
at least one storage module operative to store at least one value of the at least one metric;
a first module operative: (i) to determine whether updating the value of the at least one metric is required; (ii) when updating the value of the at least one metric is not required to respond to the request, to determine a response to the request based at least in part on at least one stored value of the at least one metric; and (iii) when updating the value of the at least one metric is required to respond to the request, to determine a response to the request based at least in part on at least one updated value of the at least one metric; and
a second module operative to, at least in response to a determination by the first module that an update is required, update the value of the at least one metric, wherein updating the value of the at least one metric comprises the steps of: (i) determining the at least one updated value of the at least one metric based at least in part on the at least one stored value of the at least one metric; and (ii) storing the at least one updated value of the at least one metric;
wherein at least the first and second modules are implemented by a processor.

11. The system of claim 10, wherein the at least one metric comprises a recursively updatable function.

12. The system of claim 10, wherein the at least one metric is based at least in part on data related to the at least one process.

13. The system of claim 12, wherein the step of updating the value of the at least one metric comprises retrieving data related to the at least one process and wherein the at least one updated value of the at least one metric is determined based at least in part on the retrieved data.

14. The system of claim 12, further comprising a third module operative to determine, based at least in part on the determined response, whether the at least one process satisfies at least one constraint.

15. The system of claim 14, wherein the at least one constraint comprises at least one of a lean process constraint and a six sigma process constraint.

16. The system of claim 14, wherein the first module is further operative to determine that updating the value of the at least one metric is required on a periodic basis.

17. The system of claim 14, wherein the first module is further operative to update the value of the at least one metric responsive to new data related to the at least one process.

18. An article of manufacture for responding to a request for a value of at least one metric associated with at least one process, the article comprising a machine-readable storage medium containing one or more software programs that, when executed, perform the steps of:
determining whether responding to the request requires updating the value of the at least one metric;
when responding to the request does not require updating the value of the at least one metric, determining a response based at least in part on at least one stored value of the at least one metric;
when responding to the request does require updating the value of the at least one metric,
updating the value of the at least one metric and determining a response based at least in part on the at least one updated value of the at least one metric; and
responding to the request with the determined response;
wherein updating the value of the at least one metric, at least when responding to the request requires updating the value of the at least one metric, comprises the steps of:
determining the at least one updated value of the at least one metric based at least in part on the at least one stored value of the at least one metric; and
storing the at least one updated value of the at least one metric.

19. The article of claim 18, wherein the at least one metric comprises a recursively updatable function.

20. The article of claim 18, wherein the at least one metric is based at least in part on data related to at least one process.

21. The article of claim 20, wherein the step of updating the value of the at least one metric comprises retrieving data related to the at least one process and wherein the at least one updated value of the at least one metric is determined based at least in part on the retrieved data.

22. The article of claim 21, wherein the one or more software programs further perform the step of:
determining, based at least in part on the determined response, whether the at least one process satisfies at least one constraint.

23. The article of claim 22, wherein the at least one constraint comprises at least one of a lean process constraint and a six sigma process constraint.

24. The article of claim 18, wherein the one or more software programs further perform the step of:
updating the value of the at least one metric responsive to new data related to the at least one process.

* * * * *